April 5, 1960     R. A. BALEY     2,931,668
COUPLING
Filed April 30, 1956
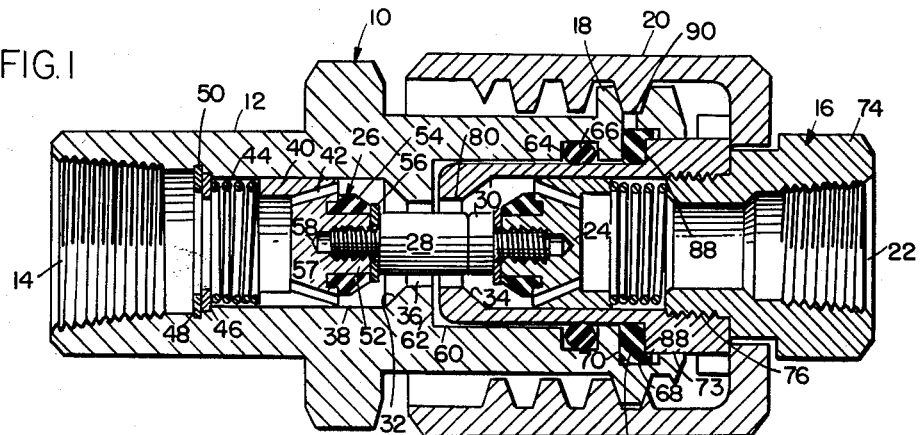
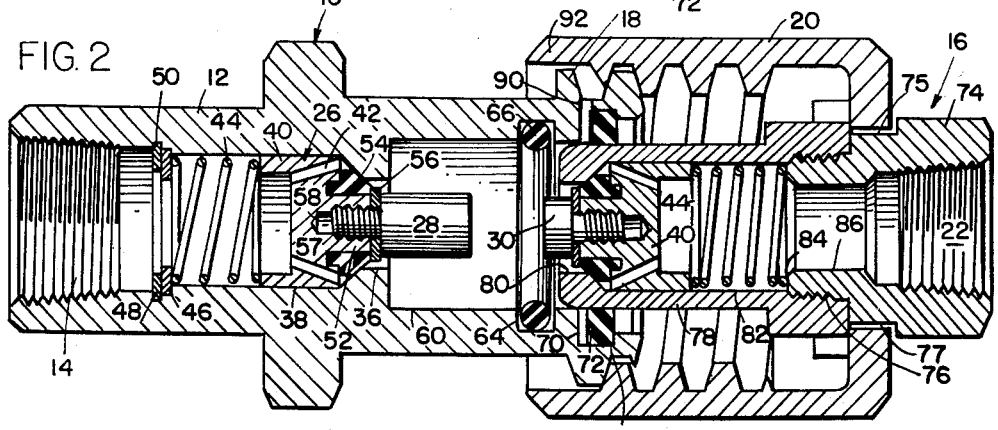
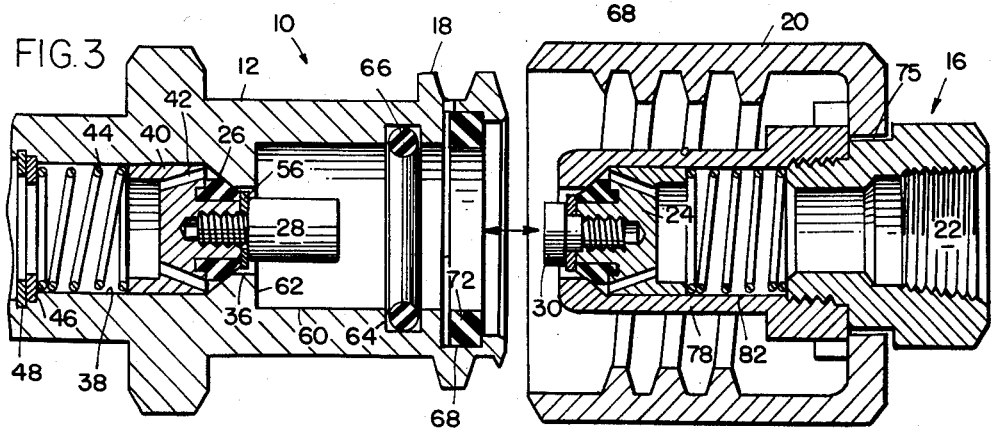
INVENTOR:
RICHARD A. BALEY
BY
ATTORNEY United States Patent Office 2,931,668
Patented Apr. 5, 1960

2,931,668

COUPLING

Richard A. Baley, Mount Prospect, Ill., assignor to The Bastian-Blessing Company, Chicago, Ill., a corporation of Illinois Application April 30, 1956, Serial No. 581,399

7 Claims. (Cl. 284—19)

This invention relates to couplings and more particularly to a readily-detachable coupling particularly suitable for use in connecting conduits carrying fluid under high pressure.

The invention is primarily directed to a detachable coupling of the self-sealing type particularly suitable for conduits used for conveying high pressure fluids such as petroleum gas in liquid or vapor form. In order to prevent escape of the fluid when the coupling was disconnected, check valves have been arranged in confronting relation within the male and female elements of a coupling so that when the elements are connected the check valves are displaced from their respective seats to afford free flow of the fluid. Bleed ports have been employed to vent fluid entrapped between the check valves and to accelerate the closing thereof as the coupling is disconnected. A disadvantage of these constructions is that the bleed ports were so positioned as to subject the operator to a stream of high-pressure fluid at a velocity sufficient to pierce the skin. As a result, the workmen were subject to danger of physical harm when disconnecting couplings of this type.

Accordingly a principal object of the invention is to provide a quickly-detachable coupling of the self-sealing type wherein a bleed port is provided which becomes operable only when the coupling has been disconnected to a predetermined extent and wherein means are provided for deflecting the vented fluid away from the operator.

Another object of the invention is to provide a coupling of the stated type which is characterized by convenience in form and improved functional characteristics.

A further object of the invention is to provide a readily-detachable coupling of the self-sealing type which may be disconnected safely and easily and which may be manufactured economically because of the interchangeability of parts.

Other and further objects, advantages and features of the present invention will be apparent to those skilled in the art from the following description, taken in conjunction with the accompanying drawings in which similar reference characters relate to similar parts and in which:

Fig. 1 is an elevational sectional view of a coupling made in accordance with the present invention and showing the constituent elements in the position they assume when the coupling is connected;

Fig. 2 is a vertical sectional view similar to Fig. 1 but showing the position of the coupling when venting occurs; and Fig. 3 is an elevational sectional view showing the coupling of Fig. 1 disconnected.

Referring now to the drawing and more particularly to Fig. 1, the coupling of the present invention, indicated generally by reference numeral 10, includes a female body member 12 having a central passage 14 in one end of which is received a male member or tailpiece 16. The female member 12 is provided with external threads 18 for threaded reception of a nut 20 rotatably connected to the male member or tailpiece 16. The male member 16 has a central passage 22 in which is slidably arranged a check valve 24. Similarly a check valve 26 is slidably arranged within the central passage 14 of the female member 12. The check valve 26 has a stem 28 which abuts against a stem 30 on the valve 24 to displace the valves from their respective seats 32 and 34 when the female member and the male member are secured together by the nut 20 in the position shown in Fig. 1. When the nut 20 is loosened the stems 28 and 30 move out of engagement with each other and the valves 24 and 26 close to prevent escape of fluid from conduits connected to the members 12 and 16.

The central passage 14 of the female member 12 comprises generally a bore 36 through which the stem 28 extends and a bore 38 of larger diameter joined to the bore 36 by a frusto-conical surface defining the seat 32. The valve 26 includes a valve body 40 cylindrical in construction and dimensioned slidably to fit within the bore 38. The valve body 40 is apertured to afford communication of fluid between the male and female members when the check valve 26 is unseated. In the present instance, the apertures take the form of circumferentially-spaced angularly-extending bores 42. The valve body 40 may be of spider construction to obtain the same result. The valve body 40 is normally urged to the right, as viewed in Fig. 1, by a compression spring 44 which abuts against an annular stop 46. The stop 46 rests against a snap ring 48 received within an annular groove 50 formed in the wall of the central passage 14. The right side of the valve body 40 is formed with a boss 52 on which is mounted an annular seal 54, desirably made of elastomeric material resistant to chemical reaction with the particular fluid conveyed. The seal 54 is retained in position by a washer 56 which in turn is secured to the boss 52 by the stem 28 having a threaded shank 57 threadedly received in a bore 58 in the boss 52. At the right end of the central passage 14 is a bore 60 in which the male member 16 is received. The bore 60 is larger in diameter than the bores 36 and 38 and forms a shoulder 62. An annular groove 64 is formed in the surface of the bore 60 to receive a sealing ring 66 which, like the seal 54, is resilient and desirably of a material resistant to chemical attack. Adjacent the mouth of the central passage 14 is an annular groove 68 defining a shoulder 70 against which a sealing washer 72 is urged by the male member 16. A counterbore 73 joins with the groove 68 for a purpose hereafter described.

The male member or tailpiece 16 includes a head 74 having a step 75 and an externally-threaded boss 76 which is received within a nipple 78. In assembling the male member 16, the head 74 is inserted in an opening 77 in the nut 20 so that the edges defining the opening 77 rest on the step 75. The nipple 78 is then threadedly connected to the head 74 in the manner shown. By this arrangement the nut 20 may be screwed on the threads 18 without rotating the conduits connected to the elements 12 and 16. The nipple 78 has a bore 80 and a bore 82, of a diameter corresponding to the diameter of the bore 38 of the female member 12, joined to the bore 80 by a frusto-conical surface defining the seat 34. By this arrangement the valve body 40 may be used in the tailpiece 16 interchangeably. Slidably mounted within the bore 82 is the check valve 24 which is substantially identical to the check valve 26 and includes a valve body 40 urged to the left, as viewed in the drawing, by a compression spring 44. The right end of the spring 44 abuts against an annular edge 84 defining bore 86 of the head 74. The check valve 24 itself differs from the check valve 26 only in that the stem 30 is of considerably less length than the stem 28. With the exception of the stems these valves are interchangeable. As shown in Fig. 1, the stem 28 extends within the bore 80 of the nipple 78 when the coupling is connected.

According to the present invention, means are provided for venting fluid entrapped in the bore 60 when the nut 20 is backed off to retract the male member 16 and for directing the vented fluid away from the operator. Referring now to Fig. 1 the sealing washer 72 is compressed against the shoulder 70 by a shoulder 88 formed on the outside of the nipple 78. The counter-bore 73 at the mouth of the body member 12 permits the entrance of the shoulder 88 for this purpose. A bleed hole 90 extends radially outwardly of the groove 68 between the first and second convolutions of the threads 18 at the mouth of the female member 12 adjacent the shoulder 70. As the nut 20 is backed off to the position shown in Fig. 2 the sealing ring 66 is cleared and the pressure entrapped within the bore 60 is sufficient to move the sealing washer 72 from its operative position shown in Fig. 1 to the position shown in Fig. 2, in which position the bleed hole 90 is uncovered. According to an important feature in the present invention the nut 20 is provided at its mouth with a skirt or hood 92 so that when venting occurs the fluid is directed axially of the coupling. By this arrangement, the vented fluid is dispersed outwardly and is directed away from the body of the operator. The engagement of the sealing washer 72 by the male member 16 in the manner shown precludes inadvertent leakage through the bleed hole 90 while the coupling is connected. It will be noted that the sealing washer 72 remains in the position shown in Fig. 1 until the sealing ring 66 is cleared. Thus continuous release of entrapped fluid through the threads, with consequent binding, is prevented.

The coupling of the present invention is characterized by safety of operation and ease and economy of manufacture due to the interchangeability of certain of the parts. The provision of the shield or hood 92 assures not only that the vented fluid will be directed away from the workman but that it will be dispersed in the form of a wide cone that is incapable of penetrating the skin of the operator.

It will be apparent that this invention may be embodied in devices which differ in many respects and details from the particular embodiment disclosed. All modifications which do not go beyond the scope of the invention will readily suggest themselves to those skilled in the art. It is, therefore, not intended that the invention be limited to the exact construction shown and described, but only to the inventive concept as defined in the appended claims.

I claim:

1. A readily detachable self-sealing coupling for pressure conduits comprising a female body having a cavity in one end with an internal annular groove near the mouth thereof extending an appreciable distance in an axial direction, a resilient sealing member axially slidable in said groove, a bleed conduit through the bottom of the groove adjacent its inner edge where it is uncovered when the sealing element is adjacent the mouth of said female member, a male member telescoping in said female member and frictionally engaging said sealing member to move it in an axial direction in said groove, said resilient element being moved to uncover said bleed conduit before said male member is dissociated from the female member.

2. A readily detachable self-sealing coupling for pressure conduits comprising a female member having a cavity in one end with a bleed conduit through the wall thereof at a point spaced from the mouth of the cavity, a male member received in said cavity in telescoping relationship, an annular groove in one of said members of appreciable axial length overlapping said bleed conduit at its inner edge, a resilient element mounted in said groove and frictionally engaged by the other of said members during said telescoping relationship, said resilient element being movable by said frictional engagement to uncover said bleed conduit when said male member is being dissociated from said female member, means on said male member for holding said resilient element over said bleed conduit when the members are fully telescoped, and means for releasably holding said member in associated relationship, the last said means covering the outlet of said bleed conduit when said resilient element is moved to a position uncovering said bleed conduit and dissociating said members upon operation thereof.

3. A readily detachable coupling for conduits conveying fluids under pressure comprising a female body member having a central passage and external threads, a check valve mounted within said central passage a spaced distance from the mouth thereof, a male member receivable in said central passage in fully associated relationship therewith and having a central passage, a check valve mounted within the central passage of said male member near the mouth thereof, the central passage of said female body member having a shoulder in proximate spaced relation to the mouth thereof, a radially extending bleed port in said female body member adjacent said shoulder, a resilient element, means for supporting said resilient element for movement towards and away from said shoulder for closing said port when disposed against said shoulder, means on said male member for holding said resilient element over said bleed port when the members are fully associated, a nut rotatably mounted on said male member and internally threaded to engage said external threads for connection of said male member and said female member to hold the members fully associated, and means carried by said check valves to open said check valves when said nut interengages said external threads and hold said check valves in their open positions when said members are fully associated, said nut having a protective shield adapted to overlie said bleed port as the bleed port is uncovered when the male member and female member are disconnected to direct the vented fluid away from the operator.

4. A readily detachable self-sealing coupling for conduits conveying fluids under pressure comprising, in combination, a female body member having a central passage, an internal groove and external threads, said passage including at one end thereof a bore and a valve seat, a check valve slidably mounted in said bore, resilient means for normally seating said valve, a male member having a central passage including a bore and a valve seat, a check valve slidably mounted in said bore, resilient means for normally seating said second check valve, a nut rotatably mounted on said male member for engaging the threads of said female member to urge said check valves into engagement whereby each valve is unseated when said nut engages said threads in threaded relationship, said female member having an annular sealing means slidably mounted for limited movement in said groove, a bleed port in said female member opening into said groove at a point removed from its outer end, said sealing means normally closing said port, said nut being operative upon retraction a predetermined distance thereof to withdraw said male member from said female member thereby closing said valves, said sealing means being subjected to fluid pressure existing between said valves upon their closing and adapted to be moved by said pressure and said male member upon its withdrawal to uncover said bleed port inwardly of said sealing means while the male member is still engaged by said sealing member, said nut having a protective shield adapted to overlie said bleed port when it is uncovered to deflect the entrapped fluid away from the operator.

5. A readily detachable self-sealing coupling for conduits conveying fluids under pressure comprising, in combination, a female body member having a central passage, an internal annular groove and external threads, said passage including at one end thereof a bore and a valve seat, a check valve slidably mounted in said bore, resilient means for normally closing said valve, a male member having a central passage including a bore and a valve seat, a check valve slidably mounted in said bore, resilient means for normally closing said second check valve, a nut rotatably mounted on said male member for engaging the threads of said female member to urge said check valves towards each other, means carried by the valves for opening said valves when moved a predetermined distance towards each other after initial relationship is established between said nut and threads, sealing means carried by said female member including spaced annular sealing elements one of which is slidably mounted for limited movement in said grove, a bleed port in said female member opening into said groove at a point removed from its outer end, said sealing means closing said port at one of its limits of movement, said nut being operative upon retraction thereof to withdraw said male member from said female member said predetermined distance while said threads and nut are threadedly engaged to move said valves away from each other beyond said predetermined distance to permit said valves to close, said one sealing element being adapted to uncover said bleed port inwardly of said sealing element while the male member is still engaged by said sealing element, said nut having a protective shield adapted to overlie said bleed port when it is uncovered to deflect the entrapped fluid away from the operator said male member clearing another one of sealing elements after the valves are closed and before the said one sealing is cleared.

6. A readily detachable self-sealing coupling for conduits conveying fluids under pressure comprising, in combination, a female body member having a central passage and external threads, said passage including at one end thereof a bore and a valve seat, a check valve means slidably mounted in said bore, resilient means for normally closing said valve means, a male member receivable in said bore in telescoping relationship and having a central passage including a second bore and a valve seat, a check valve means slidably mounted in said second bore, resilient means for normally closing said second check valve means, a nut rotatably mounted on said male member for engaging the threads of said female member to urge said check valves towards and away from mutual engagement to open them and permit their closure respectively, said female member having axially spaced sealing elements, a bleed port in said female member adjacent the outer end thereof, the outer one of said sealing elements normally closing said port when said elements are fully telescoped, said nut having internal threads starting a spaced distance from the end thereof to provide a shield overlying the bleed port while in a position in which the threads of the female member are still in partial engagement with the threads of the male member to vent fluid from said bores between said closed valve means against the shield and to deflect same away from the operator, said outer one of the sealing elements being moved by said male member from over said port during movement of said members away from each other.

7. A readily detachable coupling comprising a male member and a female member for conveying fluids under pressure, the female member having a passage therethrough enlarged at one end to receive the male member in telescoping relationship, a plurality of axially spaced annular recesses in the wall of said enlarged end, sealing elements in said recesses engaging said telescoped whole member in sealed relation the outermost of which is movable axially in its recess, a bleed passage through the wall of said female member and opening into the outermost recess at a point inwardly of the outermost sealing element when it is in its outermost position, means covering said bleed passage for drawing said telescoped members into tightly engaging relationship and means carried by said members for compressing said outermost sealing element between them to close off said bleed passage when said members are tightly engaged.

References Cited in the file of this patent

UNITED STATES PATENTS

| | | |
|---|---|---|
| 1,580,694 | Smith | Apr. 13, 1926 |
| 2,504,569 | Murphy | Apr. 18, 1950 |
| 2,638,914 | Flaith et al. | May 19, 1953 |
| 2,665,928 | Omon et al. | Jan. 12, 1954 |
| 2,736,578 | Rafferty | Feb. 28, 1956 |